United States Patent [19]
Palm et al.

[11] Patent Number: 5,171,452
[45] Date of Patent: Dec. 15, 1992

[54] PHOSPHORIC ACID WASTEWATER TREATMENT

[76] Inventors: Gordon F. Palm; R. George Hartig, both of 602 Schoolhouse Rd., Lakeland, Fla. 33813

[21] Appl. No.: 669,643

[22] Filed: Mar. 14, 1991

[51] Int. Cl.⁵ ............................................. C02F 1/52
[52] U.S. Cl. ................................... 210/710; 210/712; 210/718; 210/724; 210/726; 210/737; 210/747; 210/772; 210/906; 210/915; 423/321 R
[58] Field of Search .............. 210/702, 710, 712, 718, 210/724, 726, 737, 747, 906, 915, 772; 423/163, 321 R

[56] References Cited

U.S. PATENT DOCUMENTS

| | | | |
|---|---|---|---|
| 3,625,648 | 12/1971 | Randolph | 210/915 |
| 3,699,212 | 10/1972 | Palm | 210/915 |
| 3,725,265 | 4/1973 | Legal | 210/915 |
| 3,859,423 | 1/1975 | Hartig | 210/915 |
| 4,171,342 | 10/1979 | Hirko et al. | 423/163 |
| 4,320,012 | 3/1982 | Palm et al. | 210/713 |
| 4,374,810 | 2/1983 | O'Neill | 210/713 |
| 4,472,368 | 9/1984 | O'Neill et al. | 210/915 |
| 4,493,820 | 1/1985 | Clausen | 423/321 R |
| 4,657,680 | 4/1987 | Zibrida | 210/713 |

*Primary Examiner*—Peter Hruskoci
*Attorney, Agent, or Firm*—Charles A. McClure

[57] ABSTRACT

Phosphoric acid wastewater treatment to substantially eliminate discharge of contaminants to the environment. Acid pond water from conventional wet-phosphoric acid manufacturing is replaced by gypsum pond water having a pH closely matching that of the surroundings. Essentially all fluorides are insolubilized and substantially all phosphoric acid is recovered, minimizing loss to the environment.

12 Claims, 6 Drawing Sheets

| DESCRIPTION | SYMBOL | pH LEVEL |
|---|---|---|
| SULFURIC ACID<br>ACID PROCESS WATER (APW)<br>P₂O₅ RECOVERY LIQUID<br>FILTER WASH EFFLUENT<br>GYPSUM SLURRY (GS) | | VERY ACIDIC<br>EG., 1.5-2.0 |
| PARTLY NEUTD. ACID PROCESS WATER<br>PARTLY NEUTD. ACID PROCESS UNDERFLOW<br>PARTIALLY NEUTRALIZED GYPSUM SLURRY<br>FLOCCULENT | | MODERATELY ACIDIC<br>EG. 3.5-4.5 |
| NEUTRALIZED GYPSUM SLURRY<br>GYPSUM STACK WATER<br>pH ADJUSTED WATER TO ENVIRONMENT | | SLIGHTLY ACIDIC<br>EG. 6 |
| FRESH WATER & WATER VAPOR<br>COOLING WATER<br>STEAM | | NEUTRAL<br>EG. 7 |
| OVER NEUTD. ACID PROCESS WATER<br>OVER NEUTD. ACID PROCESS UNDERFLOW<br>LIMESTONE<br>LIMESTONE SLURRY<br>LIME<br>LIME SLURRY | | MODERATELY ALKALINE<br>EG. 8 OR 9 TO 11 |

LEGEND

FIG.5

PHOSPHORIC ACID WASTEWATER TREATMENT

TECHNICAL FIELD

This invention relates to treating wastewater from wet-process phosphoric acid manufacturing to minimize environmental disturbance and loss of desired product, economically enhancing the process.

BACKGROUND OF THE INVENTION

Conventional wet-process manufacturing of phosphoric acid, such as for fertilizer production, sets up extensive acidic water cooling ponds, which pollute the environment with residual phosphoric acid and also with fluorine-containing gases and other contaminants.

Attempts to limit the resulting contamination have had degrees of success, but acceptance of the ponds has precluded comprehensive treatment of the underlying pollution problem—and fundamentally has precluded its satisfactory resolution. In other words, for the most part the attempts have been constrained by self-limiting conditions. Examples include treatment of acid pond waters to remove metallic ions as in Mills U.S. Pat. No. 4,303,532; to recover calcium fluoride as in Hirka & Mills U.S. Pat. No. 4,171,342 or O'Neill U.S. Pat. No. 4,374,810; or to remove calcium fluoride so as to provide a reduced fluoride solution for use in wet ball-milling of phosphate rock as in O'Neill et al. U.S. Pat. No. 4,472,368.

Palm and Hartig undertook to neutralize such acid pond waters, as in U.S. Pat. No. 4,320,012. The present invention is so directed as to retain the benefits of that contribution while further minimizing pollution attributable to wet-process phosphoric acid production.

SUMMARY OF THE INVENTION

A primary object of the present invention is elimination of the air pollution associated with phosphate process acid pond waters.

Another object of this invention is elimination of ground water pollution from phosphate process acid pond waters, particularly from acidic water cooling ponds and gypsum stacks.

A further object of the invention is reduction of $P_2O_5$ losses in wet process manufacturing of phosphoric acid.

In general, the objects of the present invention are attained by substituting wholly contained acid process water for conventional acid pond water in wet-process manufacturing of phosphoric acid. An aqueous $P_2O_5$ recovery cycle is also established for leaks, spills, and wash liquid. Acid process water undergoes a stage of neutralization, whereas gypsum slurry water undergoes two stages thereof.

Substantially all fluorides are removed by non-flocculent precipitation from the acid process water circulated through flash coolers and evaporators condensers, as also is part of the entrained phosphoric acid, the rest being substantially recovered to the process. Gypsum stack water is freed of acid and soluble fluorine.

Other objects of the present invention, together with means and methods for attaining the various objects, will be apparent from the following description and accompanying diagrams of preferred embodiments, which are presented by way of example rather than limitation.

SUMMARY OF THE DRAWINGS

FIG. 0 is a LEGEND for the following schematic flow diagrams;

DESCRIPTION OF THE INVENTION

Figure 1:
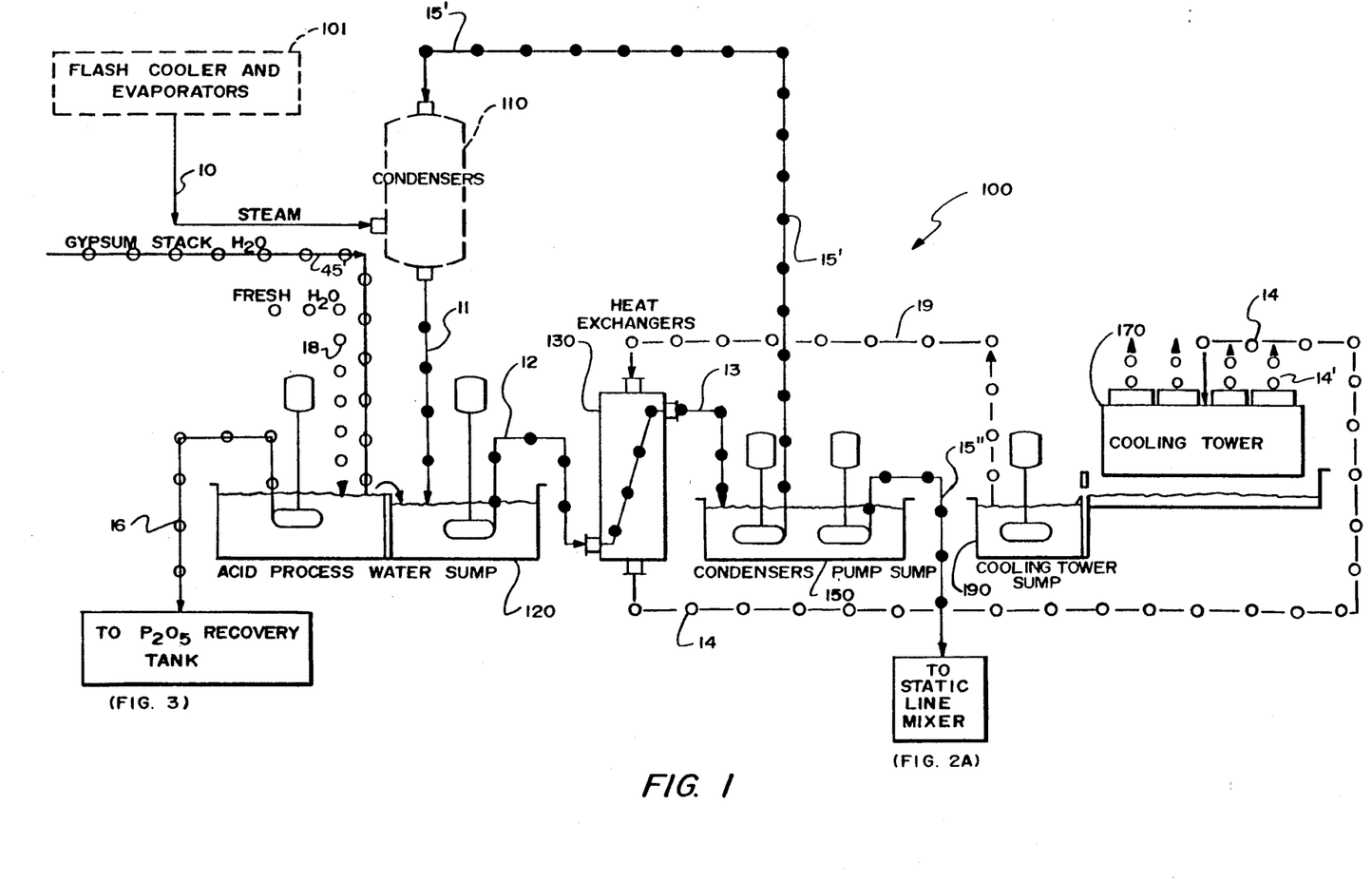
FIG. 1 is a first schematic flow diagram, featuring acid process water generation according to this invention.

For convenient reference, some pre-existing process components are represented with dashed outline, whereas major components of the invention are shown with a solid outline in block or other schematic form. Components are identified by name and by 3-digit numbers, the first digit usually being the same as the Fig. number. Inflows and outflows indicated by iconographic lines identified in the LEGEND of FIG. 1A are identified by their respective interconnecting or transfer lines as two-digit numbers, usually the same as the first two digits of an interconnected component. Suffixes for such two-digit numbers include A ("above") for overflows and B ("below") for underflows, multiple where more than one; also X, Y, etc. for line extensions; and with appended single or double primes for branches. A LEGEND in FIG. 0 identifies inflows and outflows iconographically.

An item-by-item description of all of the diagrams precedes a description of the process as such, so as to minimize interruption of the diagram description by interjected process commentary—such as composition, concentration, phase, pH, and/or temperature—and to minimize reference characters in the subsequent process description.

FIG. 0—so numbered as a LEGEND rather than an apparatus or process depiction—constitutes a ready-reference diagrammatic guide to input and output water and other aqueous liquids, slurries, etc. for easy identification, under the headings of Description, Symbol, (iconographic representation), and pH (range or approximate units).

The LEGEND entries are divided into five horizontal sections, Very Acidic (e.g., pH of 1.5-2) with five entries; Moderately Acidic (e.g., pH of 3.5-4.5) four entries; Slightly Acidic (e.g., pH of 6) several entries; Neutral (e.g., pH of about 7) several entries; and Moderately to Very Alkaline (e.g., pH 8 or 9, to 11) six entries.

In the LEGEND, the Very Acidic entries include Sulfuric Acid, double line; Acid Process Water (APW), single line beaded with filled or solid circles; $P_2O_5$ Recovery Liquid, double line beaded with filled circles; Filter Wash Effluent, dashed line beaded with filled circles; and Gypsum Slurry (GS), single line beaded alternately with both filled circles and squares. The Moderately Acidic entries are Partly Neutralized Acid Process Water (PNAPW), single line with filled circles and alternate cross-hatching; Partly Neutralized Acid Process Underflow, single line with filled squares and alternate cross-hatching; and Partly Neutralized Gypsum Slurry (PNGS), single line with alternate filled squares and filled triangles, and Flocculent, cross-hatching (without and with line). Slightly Acidic entries are Neutralized Gypsum Slurry (NGS), single line with alternate unfilled or open circles and triangles; Gypsum Stack Water (GSW), single line with open circles; and pH-Adjusted Water to Environment, open circles and alternate cross-hatching (without any line). Neutral entries are Fresh Water and Water Vapor, open circles (without line); Cooling Water, dashed line with open circles; and steam (line only). Moderately Alkaline entries are Over-Neutralized Acid Process Water (ONAPW), single line with alternate open circles and cross-hatching; Over-Neutralized Acid Process Underflow, single line with open squares; Limestone, filled triangles; Limestone Slurry, single line with filled triangles; Lime, open triangles; Lime Slurry, single line with open triangles.

FIG. 1 shows schematically the first processing area, 100, of this invention. STEAM containing gaseous fluorides and entrained phosphoric acid from phosphoric acid manufacture is fed via line 10 from FLASH COOLERS & EVAPORATORS 101 (outlined in dashed lines) such as are common in phosphoric acid wet-process operations to CONDENSERS 110 (dashed outline indicating present in existing process), where it is condensed by input acid process water (APW) drawn mainly from CONDENSERS PUMP SUMP 150 via line 15' (shown beaded with filled or solid circles) and is discharged via line 11 from the CONDENSERS into ACID PROCESS WATER SUMP 120. Such acid process water is then fed via line 12 into HEAT EXCHANGERS 130 and exits via line 13 to CONDENSERS PUMP SUMP 150, from which most of it is recirculated via line 15' to CONDENSERS 110, while a purge portion goes via line 15" to a STATIC LINE MIXER in FIG. 2A.

Cooling water enters the top of HEAT EXCHANGERS 130 via line 19 and leaves via bottom line 14, and is conveyed to the top of COOLING TOWER 170, in which it is cooled by evaporation (open circles 14' with upward arrow), and from which it drains (downward arrow) to COOLING TOWER SUMP 190 and is recirculated through line 19 to the HEAT EXCHANGERS. Neutralized GYPSUM STACK $H_2O$ (from FIG. 4) is provided via line 45' to the APW sump along with (if required, in the dry season) FRESH $H_2O$ from an external source via line 18. A side GSW stream goes via line 16 to $P_2O_5$ RECOVERY TANK in FIG. 3.

Figure 2A:
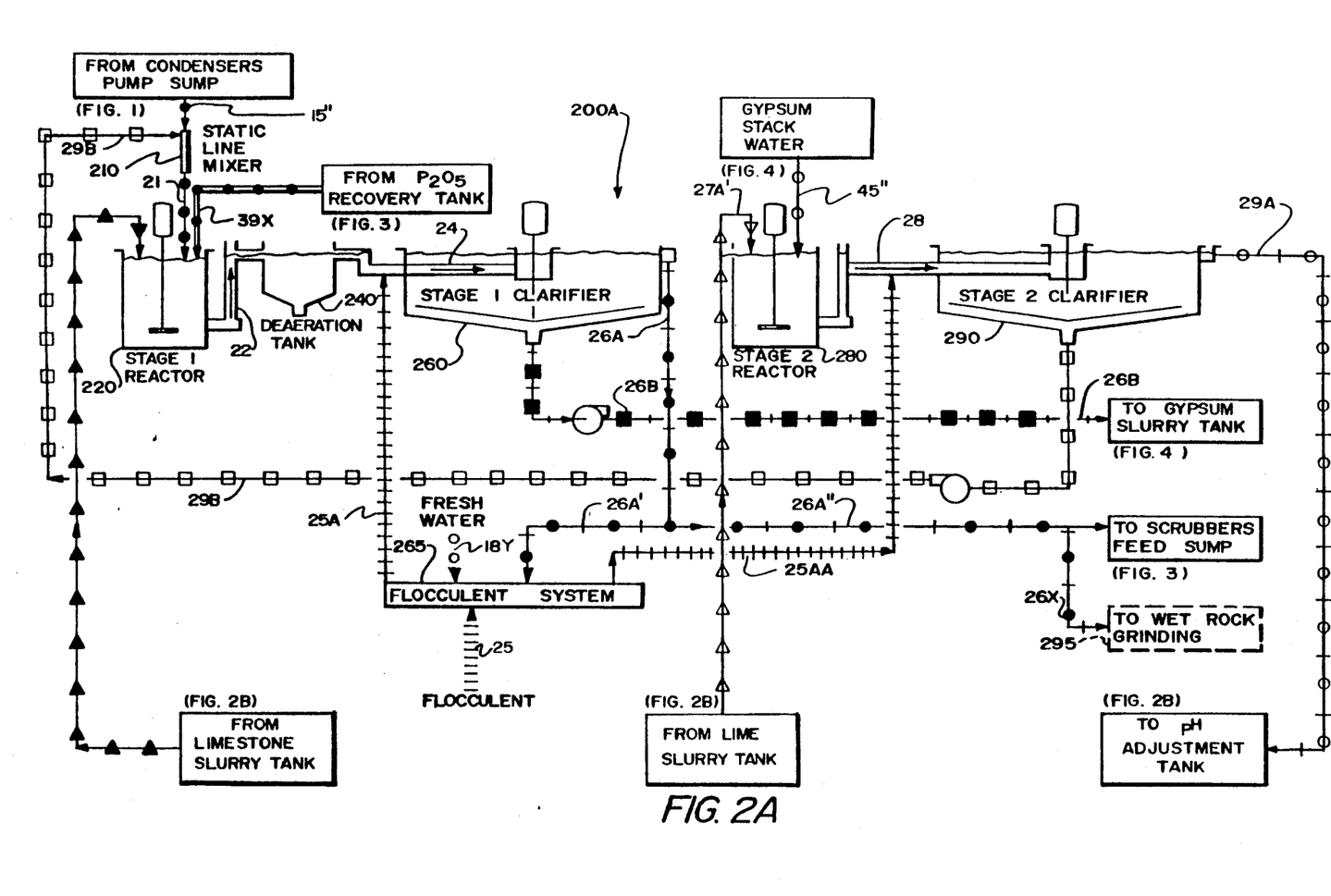
FIG. 2A is a part of a second schematic flow diagram, featuring acid process water treatment according to this invention.
Figure 2B:
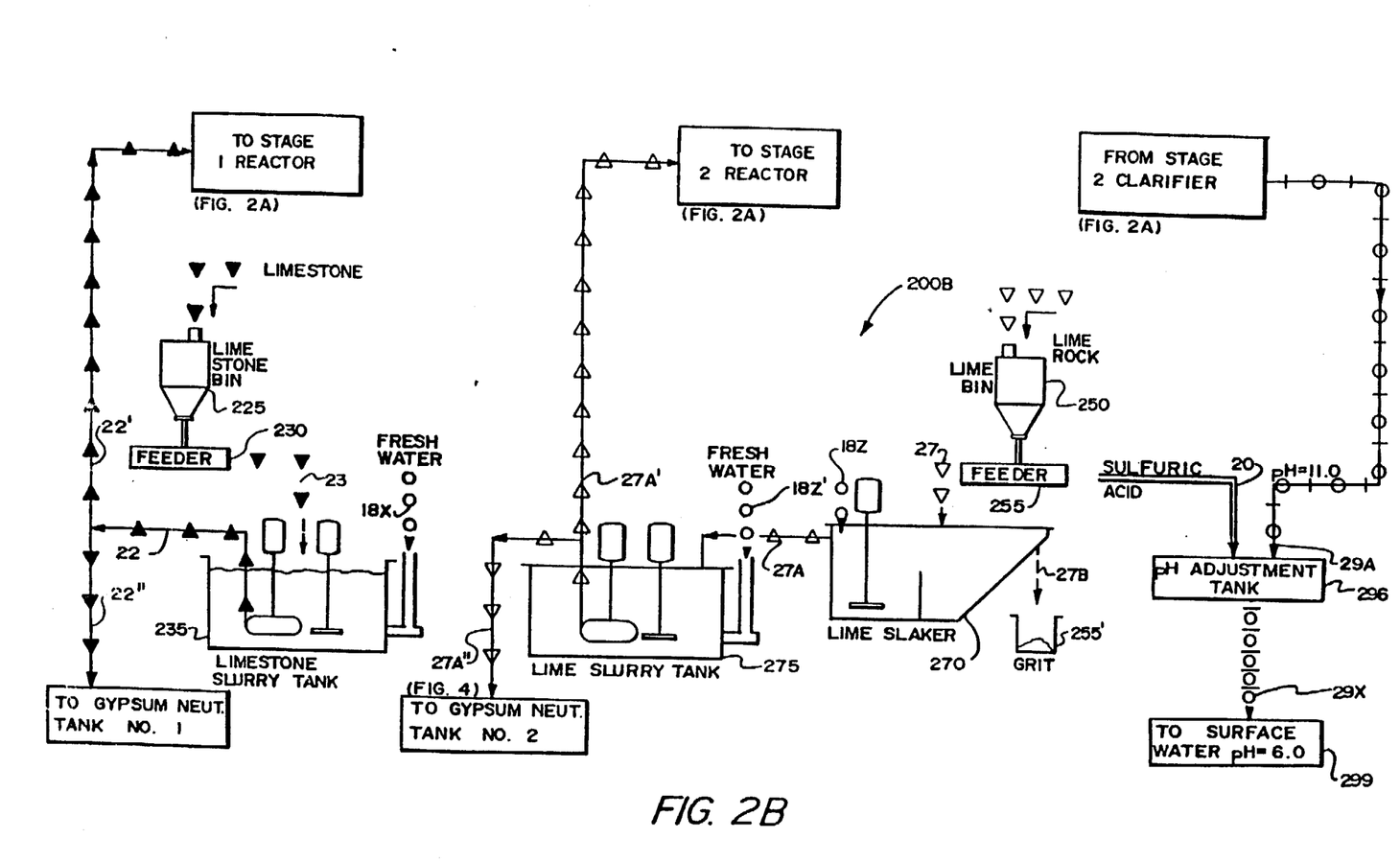
FIG. 2B is another part of a second schematic flow diagram, featuring acid process water treatment according to this invention.

FIGS. 2A and 2B show schematically a pair of second processing areas, 200A and 200B, of this invention. In FIG. 2A, STAGE 1 REACTOR 220 receives a pair of inputs via line 21 from STATIC LINE MIXER 210—acid process water (APW) fed via line 15" from the ACID PROCESS WATER SUMP in FIG. 1, and underflow slurry via line 29B (shown beaded with unfilled squares) from STAGE 2 CLARIFIER 290 (when online) downstream in this view—and also acid water from $P_2O_5$ RECOVERY TANK 360 (FIG. 3) via line 39X (a double line beaded with filled circles). The STAGE 1 REACTOR contents pass via line 22 to DEAERATION TANK 240 and then on to STAGE 1 CLARIFIER 260. The underflow slurry from the clarifier is forwarded via line 26B (beaded with filled squares) to a GYPSUM SLURRY TANK in FIG. 4. Overflow from the first clarifier goes via line 26A and branch 26A" to SCRUBBERS FEED SUMP 350 in FIG. 3, and also in part via line 26X to WET ROCK GRINDING 295 indicated here as located elsewhere. In other part the first clarifier overflow passes via line 26A and branch 26A' to FLOCCULENT SYSTEM 265, which receives FLOCCULENT from an external source via line 25 (cross-hatching only), and receives diluent FRESH WATER via line 18Y, whereupon diluted flocculent (cross-hatched line) is fed via line 25A to STAGE 1 CLARIFIER 260, and via line 25AA to STAGE 2 CLARIFIER 290.

In FIG. 2B, LIMESTONE (a succession of filled triangles) is fed into LIMESTONE BIN 225 and is discharged onto feeder 230, which forwards it via path 23 to LIMESTONE SLURRY TANK 235, into which FRESH WATER is fed via line 18X. Much of the resulting limestone slurry is fed via line 22 and branch line 22' into APW neutralization STAGE 1 REACTOR 220 (raising the pH from below 2 to about 4 ½), while the rest is forwarded via branch line 22" to a GYPSUM NEUTRALIZATION TANK No. 1 in FIG. 4.

FIG. 2B also shows (right of center) LIME ROCK fed into LIME BIN 250 (as a succession of open triangles) and via FEEDER 255 and path 25 to LIME SLAKER 270, where it is slaked with fresh water from line 18Z. Grit accumulates and is removed via line 27B to grit collector 255' to prevent equipment degradation. Lime slurry from the LIME SLAKER 270 is diluted in LIME SLURRY TANK 275 with addition of water via line 18Z'. The resulting diluted lime slurry is fed via line 27A' (beaded with open triangles) to STAGE 2 REACTOR (FIG. 2A) when on-line and to GYPSUM NEUTRALIZATION TANK No. 2 in FIG. 4.

In the event of excessive rainfall into the GYPSUM STACK & RAINFALL SURGE POND (FIG. 4) resulting excess gypsum stack water (GSW) is sent via line 45" to STAGE 2 REACTOR 280, in FIG. 2A, where it is reacted with lime slurry received via line 27A' and then discharged to STAGE 2 CLARIFIER 290. Resulting clear overflow alkaline or over-neutralized acid process water (ONAPW) proceeds from there via line 29A to pH ADJUSTMENT TANK 295 (in FIG. 2B), where it is joined by pH-adjusting SULFURIC ACID from line 20 before being discharged.

In the pH ADJUSTMENT TANK of FIG. 2B, the pH is matched to the usually slightly acidic pH at a pre-selected environmental discharge location. The output substantially neutralized water (with pH ≅6) is then returned TO SURFACE WATER 299 via line 29X (cross-hatch and unfilled circles). The underflow slurry from STAGE 2 CLARIFIER 290 is returned via line 29B to STATIC LINE MIXER 210, where it dissolves in the acid process water entering via line 15", and goes via line 21 with the rest of the mixer output to STAGE 1 REACTOR 220.

Figure 3:
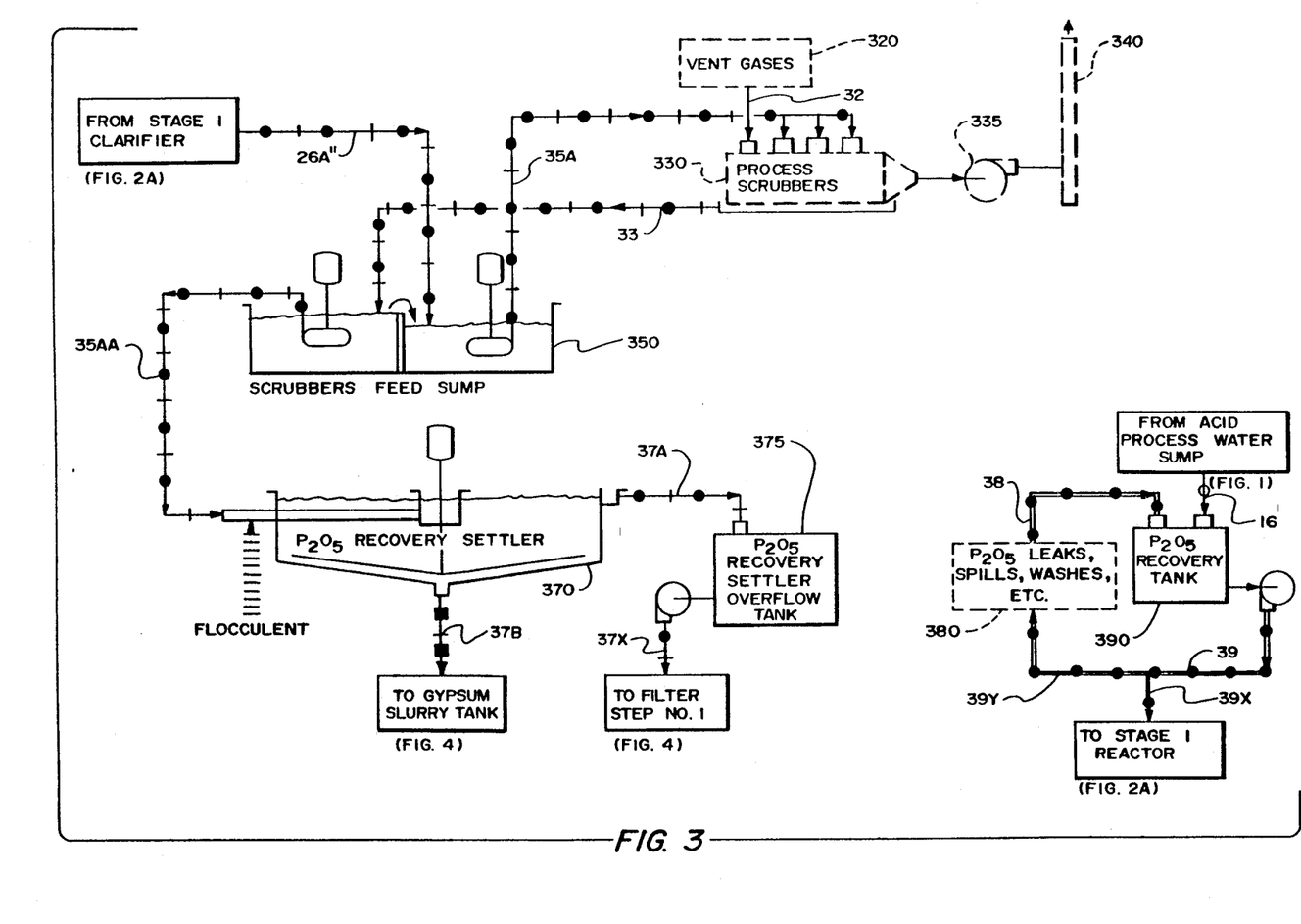
FIG. 3 is a third schematic flow diagram, featuring phosphoric acid recovery according to this invention.

FIG. 3 shows schematically a third processing area, 300, of this invention. Overflow from STAGE 1 CLARIFIER 260 is received via line 26A" from FIG. 2A directly into SCRUBBERS FEED SUMP 350. Sump water is pumped mostly to PROCESS SCRUBBERS 330 (outlined in dashed lines, as process apparatus) via line 35A. The PROCESS SCRUBBERS also receive VENT GASES 320 from elsewhere in the wet-processing. Blower 335 forces scrubbed gases up and out of STACK 340 and into the surrounding atmosphere. The still warm scrubber discharge water returns via line 33 to SCRUBBERS FEED SUMP 350, from which purge line 35AA goes to P₂O₅ RECOVERY SETTLER 370. Underflow from this settler goes via line 37B to GYPSUM SLURRY TANK 410 in FIG. 4, whereas the overflow goes to P₂O₅ RECOVERY SETTLER OVERFLOW TANK 375 and is pumped via line 37X to FILTER WASH STEP No. 1 in FIG. 4.

FIG. 3 also shows, apart from the foregoing, receipt of water from ACID PROCESS WATER SUMP 120 of FIG. 1 via line 16 into P₂O₅ RECOVERY TANK 390. Overflow from the tank is circulated via line 39 and line 39Y for use on LEAKS, SPILLS, WASHES, ETC. 380 elsewhere and is returned via line 38 to P₂O₅ RECOVERY TANK 390. A purge stream is sent via line 39X to the STAGE 1 REACTOR in FIG. 2A.

Figure 4:
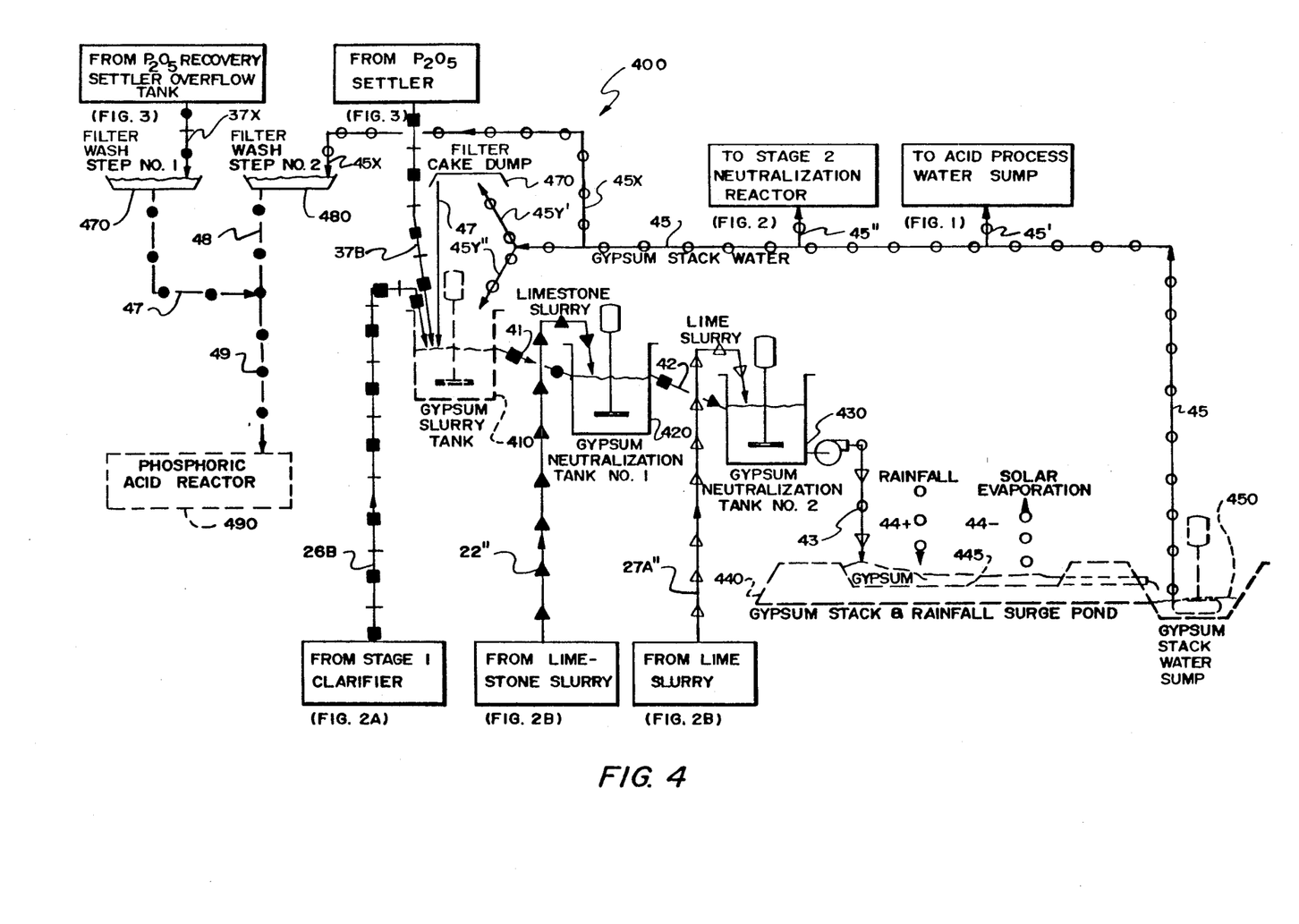
FIG. 4 is a fourth schematic flow diagram, featuring gypsum stack water generation and treatment by this invention.

FIG. 4 shows schematically the last processing area, 400, of this invention, utilizing a gypsum stack with a rainfall surge pond of a type usual in wet-process phosphoric acid manufacturing but now with important distinctions. Underflows via line 26B from the STAGE 1 CLARIFIER in FIG. 1, and via line 37B from the P₂O₅ RECOVERY SETTLER in FIG. 3, enter GYPSUM SLURRY TANK 410, as do gypsum filter cakes from the plant's FILTER CAKE DUMP 470 via path 47 and recirculated gypsum stack water from GYPSUM STACK WATER SUMP 450. The filter cakes undergo FILTER WASH STEP No. 1 (470) with water from P₂O₅ RECOVERY SETTLER OVERFLOW TANK 375 via line 37X—and FILTER WASH STEP No. 2 (480) with recirculated gypsum stack water via line 45X.

The gypsum slurry proceeds in FIG. 4 from the GYPSUM SLURRY TANK via line 41 to GYPSUM NEUTRALIZATION TANK No. 1 (410), which receives LIMESTONE SLURRY from the LIMESTONE SLURRY TANK in FIG. 2B, and then further as a partly neutralized gypsum slurry into GYPSUM NEUTRALIZATION TANK No. 2 (420), to receive LIME SLURRY from the LIME SLURRY TANK in FIG. 2B. From the last tank, resulting neutralized gypsum slurry is spread via path 43 onto GYPSUM STACK 440, with adjacent RAINFALL SURGE POND 445. Both stack and pond receive water as RAINFALL and lose water to SOLAR EVAPORATION via respective paths Overflow from the surge pond gathers in GYPSUM STACK WATER SUMP 450 and is recirculated via line 45 and extension line 45X to FILTER WASH STEP No. 2, also to sluicing gypsum filter cakes in FILTER CAKE DUMP 470 via extension line 45Y' and directly into GYPSUM SLURRY TANK 410 via extension line 45Y". Wash water from FILTER WASH STEP No. 1 via line 47, and from FILTER WASH STEP No. 2 via line 48, combines in line 49 to PHOSPHORIC ACID REACTOR 490 for dissolved P₂O₅ recovery.

Phosphoric acid wastewater treatment according to this invention is readily understood from the accompanying diagrams and their description in the light of the operational information given below. About a half dozen main circuits or flow paths are recapitulated, with appropriate comment about the conditions prevailing, or changes occurring, at various locations and times. It will be understood that such functional subdivision is more or less a matter of convenience and that the invention as a whole is more than a mere aggregation of its parts, regardless of whether one or more of them may be what a skilled person would attempt in similar circumstances.

In acid process water (APW) condenser circuit (FIG. 1), steam from flash coolers and evaporators of a wet-process phosphoric acid plant is condensed with APW water at about 35' C. (95' F.), which warms to about 50' C.–55' C. (about 120' F.–130' F.) in doing so. The warm water is cooled in heat exchangers by a separate circuit of cooling water recirculating from there to a cooling tower and back in a range of about 30' C. to about 50' C. (about 85' F. & 120' F.–125' F.).

The APW absorbs substantially all gaseous fluorides evolved by the flash coolers and evaporators, as well as collecting entrained phosphoric acid. Concentrations are usually in the range of about 15 to 18 (averaging about 16½) parts per thousand—16,500 parts per million (ppm)—of fluorine (F) and about half as much P₂O₅. A purge stream from the APW sump precludes accumulation above such concentrations—and proceeds as considered below. The APW sump receives on the side, if required as make-up during the dry season, make-up water in the form of fresh water from an external source and/or neutralized gypsum stack water of this invention. Such a side stream is withdrawn and is sent to P₂O₅ recovery, below.

The withdrawn purge APW proceeds to a two-stage neutralization (FIG. 2A). Limestone slurry provided to the first-stage reactor raises the pH of the APW (usually in the range of about 1½ to a shade over 2, averaging a couple tenths below 2) to a range of about 3 to 4½—at which essentially all the fluorides, and about thirty percent of the P₂O₅, precipitate, together with heavy metals and radium-226, whereupon such underflow goes to a gypsum slurry tank (considered further below). The clarified overflow goes as partly neutralized process water (PNAPW) to the scrubbers feed sump (also considered further below).

In the event of excess rainfall, necessitating release of some neutralized gypsum stack water to surface streams in the external environment, partially neutralized gypsum stack water is sent to the second-stage reactor, where slaked lime raises the pH to at least the range of about 8 or 9, but optionally as high as 11, so as to precipitate remaining trace amounts of fluorides and substantially all the remaining phosphate. They and other dissolved contaminants, such as gypsum, precipitate and are removed in the stage 2 clarifier underflow, which is recirculated to the static line mixer and via the latter to the stage 1 reactor.

The purified overflow water goes to the pH adjustment tank, where added acid stabilizes its pH to match that of the environment into which it is to be discharged, usually surface waters. Normally a pH of about 6 (one pH unit below neutral 7) provides a good match.

Vent gases from filters and various vessels of the wet-process phosphoric plant's acid reactor are scrubbed (FIG. 3) with the clarified first-stage overflow, removing fluorides and entrained P₂O₅ (only minor amounts present). Use of PNAPW at a pH of about 3 to 4½ and only about 20 to 40 ppm F and about 5–6000 ppm P₂O₅, (instead of conventional gypsum acid pond water containing upwards of 20,000 ppm of each) considerably improves the fluoride removal. Scrubber discharge water at about 40' C.–45' C. (105' F.–120' F.) is recirculated to the scrubbers feed sump. The PNAPW water must be rid of its suspended solids before its P₂O₅ can be recovered without blinding the filter cake, so it is fed from the scrubbers feed sump to a clarifier or settler, from which the underflow goes to a gypsum slurry tank (FIG. 4), and the overflow water is sent to the first filter wash step, considered further below.

Fresh water and gypsum stack water from the acid process water sump is sent to a $P_2O_5$ recovery tank for use in washing down spills, leaks, etc. (being recycled to the recovery tank). A purge stream is sent to the stage 1 reactor for removal of fluorides and adjustment of pH.

Treated acid process water (PNAPW) with a pH of about 3 to 4.5, and fluorides of about 20–40 ppm F, is suitable for use in wet rock grinding, so a side stream is conveniently so utilized.

According to this invention gypsum filter cakes from phosphoric acid plant operations undergo a first filter cake wash (FIG. 4) with $P_2O_5$ recovery settler water (from FIG. 3), which contains about 70% of the total $P_2O_5$ entrainment loss after the treatment to a pH of about 3 in the first APW neutralization stage. The filter wash volume approaches $1\frac{1}{2}$ (e.g., about 1.4) displacements of the filter cake. The second filter cake wash (FIG. 4) is performed with gypsum stack water, and the water from both washes is returned to the plant phosphoric acid reactor for recovery whereas the washed filter cakes go into the gypsum slurry tank.

Combined wash volume approximates the volume customary in plants using wet grinding of phosphate rock. Approximately one percent of water-soluble $P_2O_5$, normally lost in conventional operations, is not recovered regardless of steps taken. Also fed to the gypsum slurry tank are gypsum stack water and the underflow from the first stage of neutralization (in FIG. 2A), or the underflow solids may be sent via a separate line to discharge within the gypsum stack. The slurry from the gypsum slurry tank is thoroughly mixed and then is passed to a first gypsum neutralization tank, into which limestone is fed from the limestone slurry tank (in FIG. 2B) to raise the pH to about 4.5, precipitating fluorides, phosphates, heavy metals, and radium-226. This neutralizes weak acids in the gypsum, and then overflows into a second gypsum neutralization tank into which slaked lime is fed from the lime slurry tank (also in FIG. 2B) to raise the pH to about 6.

The neutralized gypsum slurry is spread on the gypsum stack and so dewatered. Water drains from the gypsum stack into an adjoining rainfall surge pond, which increases in volume thereby and from rainfall as it occurs. The surge pond also loses water by evaporation. A sump receives the neutralized APW (and rainfall) from the rainfall surge pond. The sump water is recirculated to the locations mentioned, such as the APW sump (FIG. 1), the stage 2 neutralization reactor (FIG. 2A), the second filter wash, and mainly the gypsum slurry tank (the last two both in FIG. 4).

The gypsum stack water is distinguished from the usual gypsum acid pond water by its substantial lack of phosphoric (and other) acids and of dissolved fluorides, as already noted. The process of this invention is balanced so that no material accumulates to excess and no required material depletes excessively. The operating cost is not penalized in achieving drastically increased environmental acceptability but actually is reduced through increased recovery of $P_2O_5$ and decreased contaminant containment requirements.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

We claim:

1. Method of treating wastewater from wet-process phosphoric acid manufacturing to minimize discharge of contaminants, including calcium, fluorine, and phosphorus residues, comprising the steps of
   converting a neutralized waste gypsum slurry from said manufacturing including said contaminants into a stack alongside an adjacent rainfall surge pond, and
   combining neutral gypsum stack water (GSW) drained from the stack or pond with acid process water (APW) generated from a condenser for condensing steam containing gaseous fluorides and entrained phosphoric acid produced from flash coolers and evaporators in said manufacturing, and recycling a portion of the combined water to said condenser to condense said steam.

2. Treatment method according to claim 1, including the step of recovering phosphoric acid leaks, spills, and washes from said manufacturing with a side stream of the combined water.

3. Treatment method according to claim 1, including steps of collecting the contaminants in the combined water and precipitating them therefrom by neutralization for disposal apart therefrom.

4. Treatment method according to claim 1, including steps of neutralizing acid process water from said manufacturing and washing gypsum filter cake from the manufacturing with the neutralized acid process water.

5. Treatment method according to claim 4, including the step of subsequently washing the gypsum filter cake with GSW as a separate wash.

6. Acid process water (APW) method of treating residual gypsum cake and wastewater from wet-process phosphoric acid manufacturing to reduce environmental pollution therefrom, comprising the steps of
   collecting APW containing fluoride gases and entrained phosphoric acid generated in a condenser for condensing steam produced from flash coolers and evaporators in said manufacturing,
   substantially neutralizing in a reactor and clarifying such APW in a clarifier and thereby precipitating therefrom calcium fluoride together with substantial fluoride and $P_2O_5$ content in the underflow therefrom, settling the overflow from said clarifier tank in a $P_2O_5$ recovery settling tank, washing the gypsum cake with the overflow from said settling tank,
   slurrying the gypsum cake and the underflow from said clarifier together and substantially neutralizing the resulting slurry, converting the slurry into a stack for drainage alongside an adjacent rainfall surge pond, and recirculating the drained neutralized gypsum stack water (GSW) back to slurry gypsum cake.

7. APW treatment method according to claim 6, including the step of cooling a portion of the APW after the collecting step by heat-exchange with liquid circulating in a separate closed loop.

8. APW treatment method according to claim 6, including the step of establishing a gypsum stack water sump adjoining the rainfall surge pond to collect overflow therefrom for recirculation to an APW sump.

9. APW treatment method according to claim 6, including the step of diverting a side stream of APW to recover $P_2O_5$ from leaks in said manufacturing.

10. APW treatment method according to claim 9, including the step of using a portion of the overflow from said clarifier to scrub vent gases from said wet-process phosphoric acid manufacturing.

11. APW treatment method according to claim 10, including the step of using vent-gas scrubbing sump liquid generated from the scrubbing of said vent gases to wash the gypsum filter cake.

12. Method of substantially eliminating fluoride emissions to the atmosphere and phosphoric acid infiltration into environmental waters from aqueous and solid wastes left over from wet-process phosphoric acid manufacturing, comprising the steps of collecting gaseous fluoride emissions and entrained phosphoric acid to generate acid process water (APW) and collecting aqueous wastes therein, neutralizing the resulting APW and thereby precipitating therefrom fluorides along with other contaminants, removing the contaminants with underflow in a clarifier and forming a clarified overflow, settling said overflow from said clarifier in a $P_2O_5$ recovery settler, slurrying the precipitate with gypsum filter cake from the manufacturing washed with the overflow from said settler, neutralizing the resulting slurry and converting it to a gypsum stack adjoining a rainfall surge pond for drainage and adjusting the pH of the drained gypsum stack water to substantially equal the pH of environmental waters and discharging the pH-adjusted gypsum stack water into such waters.

* * * * *

UNITED STATES PATENT AND TRADEMARK OFFICE
CERTIFICATE OF CORRECTION

PATENT NO. : 5,171,452

DATED : December 15, 1992

INVENTOR(S) : Naoya Nishida, et al

It is certified that error appears in the above-indentified patent and that said Letters Patent is hereby corrected as shown below:

In the drawings, Sheet 3 of 3, consisting of Fig. 3, should be deleted to be replaced with the missing Fig. 2B, as shown on the attached page.

Signed and Sealed this

Eleventh Day of April, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,171,452
DATED : January 11, 1994
INVENTOR(S) : Naoya Nishida et al It is certified that error appears in the above-indentified patent and that said Letters Patent is hereby corrected as shown below:

Column 2, lines 3 and 4, delete "FIG. 0 is a LEGEND for the following schematic flow diagrams;".

Figure 5:
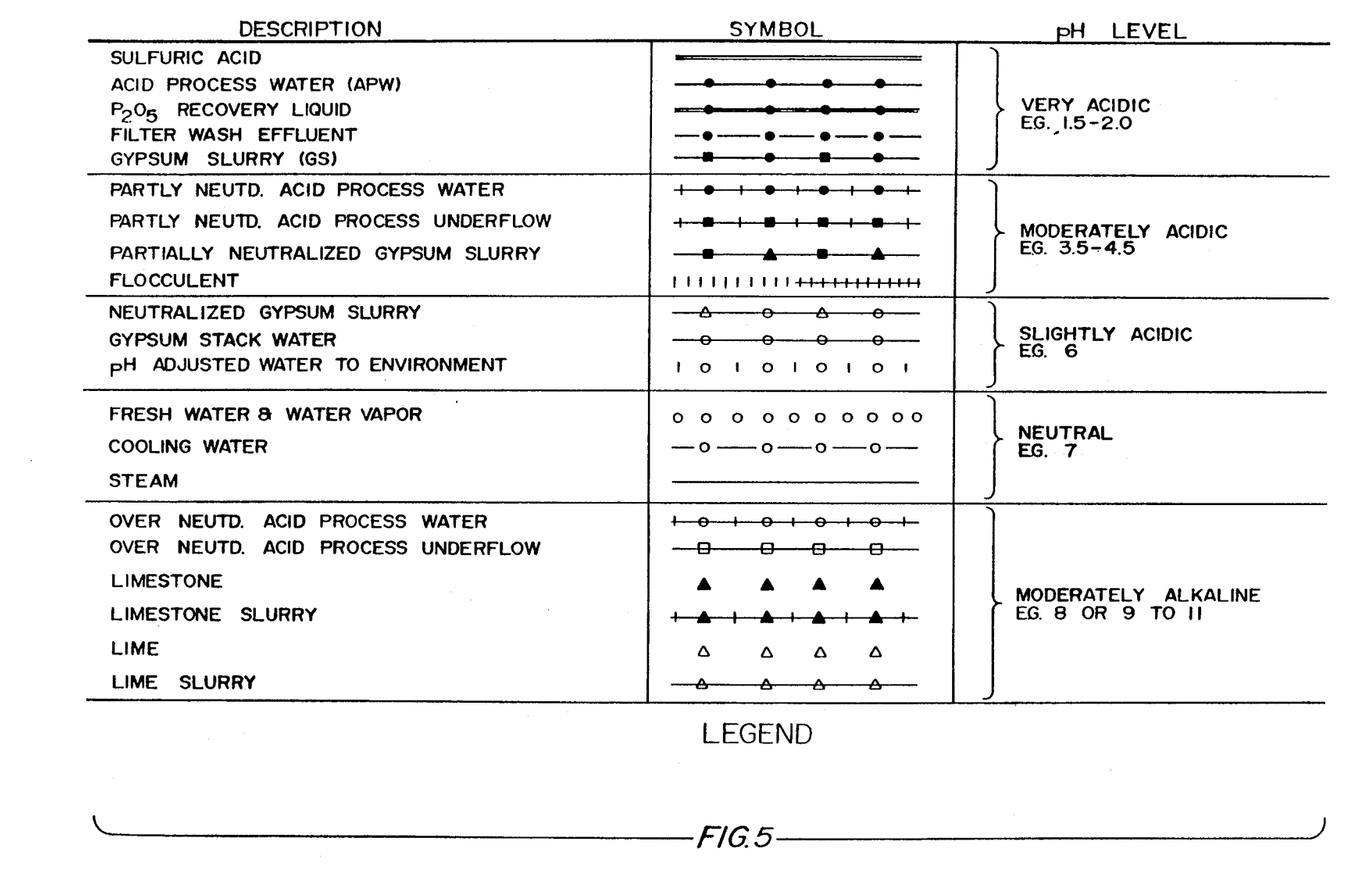

Column 2, line 20, insert --FIG. 5 is a LEGEND for the foregoing schematic diagrams.--.

Column 2, lines 37 and 46, change "FIG. 0" to --FIG. 5--.

Column 3, line 57, change "ACID PROCESS WATER" to --CONDENSERS PUMP--.

Column 4, line 25, change "25" to --27--.

Column 4, line 43, change "295" to --296--.

Column 5, line 20, change "FIG. 1" to --FIG. 2A--.

Column 5, line 33, change "410" to --420--.

Column 5, line 37, change "420" to --430--.

Column 5, line 44, add a period after "paths".

Column 6, change single-quote symbol to degree symbol --°--, in the following lines:
    line 4, three occurrences;
    line 5, three occurrences;
    line 8, two ocurrences;
    line 9, three occurrences; and
    line 63 four occurrences.

FIG. 2B